United States Patent

Moritomo

(10) Patent No.: US 10,431,995 B2
(45) Date of Patent: Oct. 1, 2019

(54) ELECTRONIC DEVICE AND CHARGE CONTROL METHOD

(71) Applicant: CANON KABUSHIKI KAISHA, Tokyo (JP)

(72) Inventor: Hiroshi Moritomo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/299,942

(22) Filed: Oct. 21, 2016

(65) Prior Publication Data

US 2017/0126029 A1    May 4, 2017

(30) Foreign Application Priority Data

Oct. 30, 2015   (JP) ................................. 2015-214808

(51) Int. Cl.
*H02J 7/00*    (2006.01)

(52) U.S. Cl.
CPC .......... *H02J 7/0021* (2013.01); *H02J 7/0044* (2013.01); *H02J 2007/0001* (2013.01)

(58) Field of Classification Search
CPC . H02J 7/0021; H02J 7/0044; H02J 2007/0001
USPC ........................................................ 320/106
See application file for complete search history.

(56) References Cited

U.S. PATENT DOCUMENTS

| | | | | |
|---|---|---|---|---|
| 8,387,113 | B2* | 2/2013 | Shimada | G06F 1/28 320/106 |
| 8,981,731 | B1* | 3/2015 | Oku | H02J 7/027 320/107 |
| 9,043,059 | B2* | 5/2015 | Ishibashi | B60L 11/1824 701/22 |
| 9,198,037 | B2* | 11/2015 | Chen | H04L 63/0492 |
| 9,559,524 | B2* | 1/2017 | Uramoto | H02J 7/0004 |
| 9,634,502 | B2* | 4/2017 | Von Novak, III | H02J 7/0044 |
| 9,660,480 | B2* | 5/2017 | Yoon | H02J 7/0047 |
| 9,753,827 | B2* | 9/2017 | Kim | G06F 11/3051 |
| 2011/0211177 | A1* | 9/2011 | Lee | G03B 21/14 353/119 |
| 2015/0188346 | A1* | 7/2015 | Oku | H02J 7/0029 320/107 |
| 2016/0164326 | A1* | 6/2016 | Chen | H02J 7/0047 320/107 |
| 2016/0294206 | A1* | 10/2016 | Okawa | H02J 7/0004 |

FOREIGN PATENT DOCUMENTS

JP   2005-341775 A   12/2005

* cited by examiner

*Primary Examiner* — M Baye Diao
(74) *Attorney, Agent, or Firm* — Venable LLP

(57) ABSTRACT

An electronic device includes a power supply unit that supplies power received from an external apparatus to the electronic device, a first authentication unit that performs an authentication process for the external apparatus with power supplied from the power supply unit, a second authentication unit that performs an authentication process for a battery with power supplied from the power supply unit when authentication by the first authentication unit has succeeded, and a charging unit that initiates charging the battery with power supplied by the power supply unit when authentication by the second authentication unit has succeeded.

21 Claims, 4 Drawing Sheets

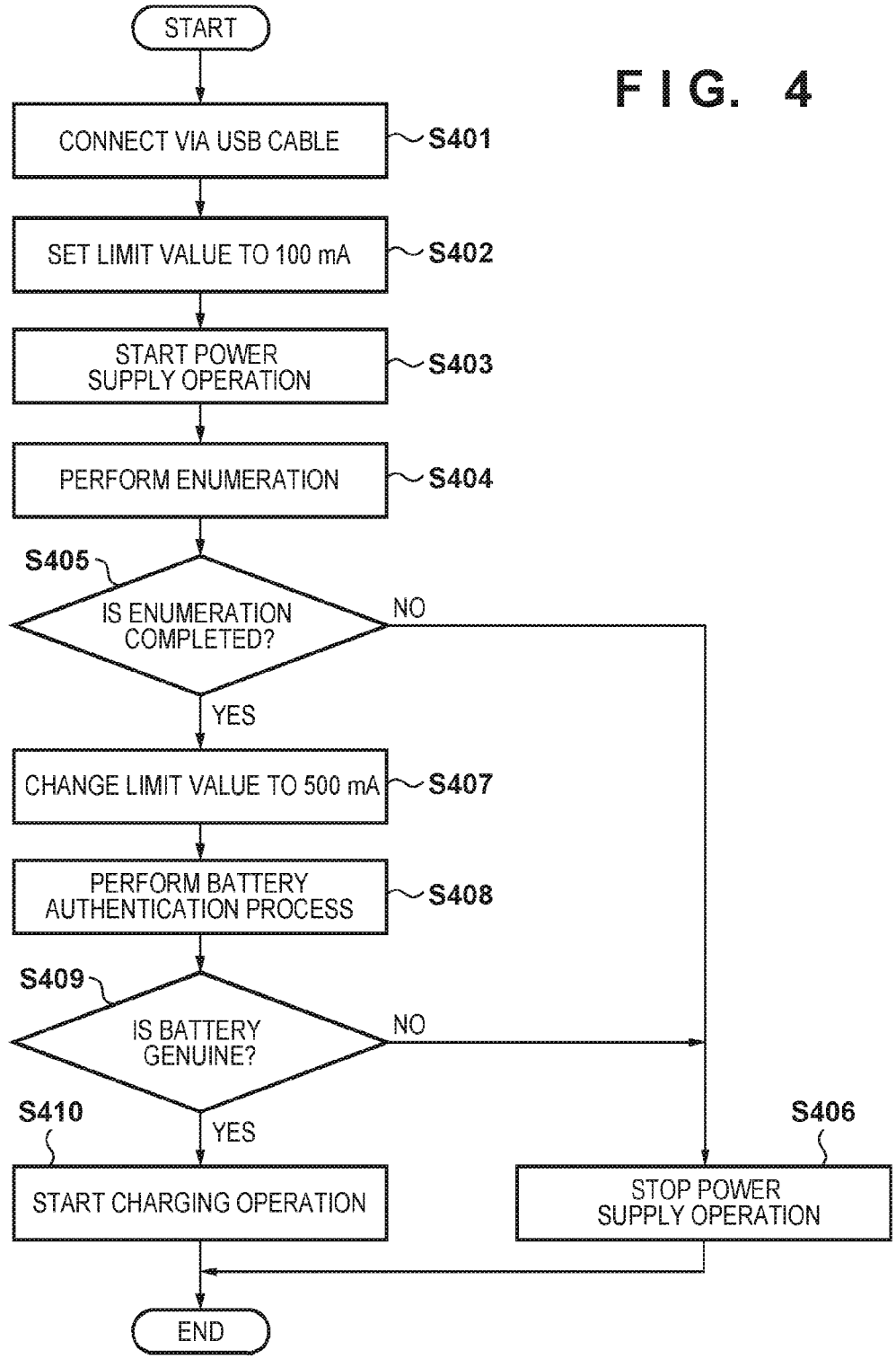

ELECTRONIC DEVICE AND CHARGE CONTROL METHOD

BACKGROUND

Field of the Invention

Aspects of the present invention relate to an electronic device which can charge a battery and a method for controlling charging of a battery.

Description of the Related Art

An electronic device such as a digital camera generally includes a detachable battery. It is known that such an electronic device is configured to charge a battery with power supplied via a USB (Universal Serial Bus) cable while the battery is mounted in the device. When an external apparatus is connected to the electronic device via the USB cable, a series of data exchange called enumeration is performed between them. This enumeration allows the electronic device to grasp identity concerning power which can be supplied by the connected external apparatus.

When an electronic device uses a detachable battery, an unidentified battery may be mounted in the device. When charging an unidentified battery, it is necessary to give consideration to the safety of the electronic device. Japanese Patent Laid-Open No. 2005-341775 discloses a technique of performing an authentication process by exchanging data between the electronic device and a mounted battery to determine whether the battery is genuine, and performing charge control upon grasping the identity of the battery by the authentication process.

According to Japanese Patent Laid-Open No. 2005-341775, after the identity of a battery is clarified by an authentication process, the battery is charged. However, there is no consideration given to clarifying the identity of an external apparatus as a power supply source for charging a battery.

SUMMARY

According to an aspect of the present invention, there is provided an electronic device which can safely charge a battery.

According to an aspect of the present invention, there is provided a method of safely charging a battery.

According to an aspect of the present invention, there is provided an electronic device comprising: a power supply unit that supplies power received from an external apparatus to the electronic device; a first authentication unit that performs an authentication process for the external apparatus with power supplied from the power supply unit; a second authentication unit that performs an authentication process for a battery with power supplied from the power supply unit when authentication by the first authentication unit has succeeded; and a charging unit that initiates charging the battery with power supplied by the power supply unit when authentication by the second authentication unit has succeeded.

According to an aspect of the present invention, there is provided a method comprising: performing an authentication process for an external apparatus, in accordance with connection to the external apparatus, with power received from the connected external apparatus; performing an authentication process for a battery with power received from the external apparatus when authentication by an authentication process with the external apparatus has succeeded; and initiating to charge the battery with power received from the external apparatus when authentication by an authentication process with the battery has succeeded.

Further features and aspects of the present invention will become apparent from the following description of exemplary embodiments.

BRIEF DESCRIPTION OF THE DRAWINGS

FIG. 4 is a flowchart illustrating an exemplary process at the time of connection to an external apparatus.

DESCRIPTION OF THE EMBODIMENTS

Exemplary embodiments, features, and aspects of the present invention will be described below with reference to the drawings. However, aspects of the present invention are not limited to the following embodiments.

[First Embodiment]

Figure 1:
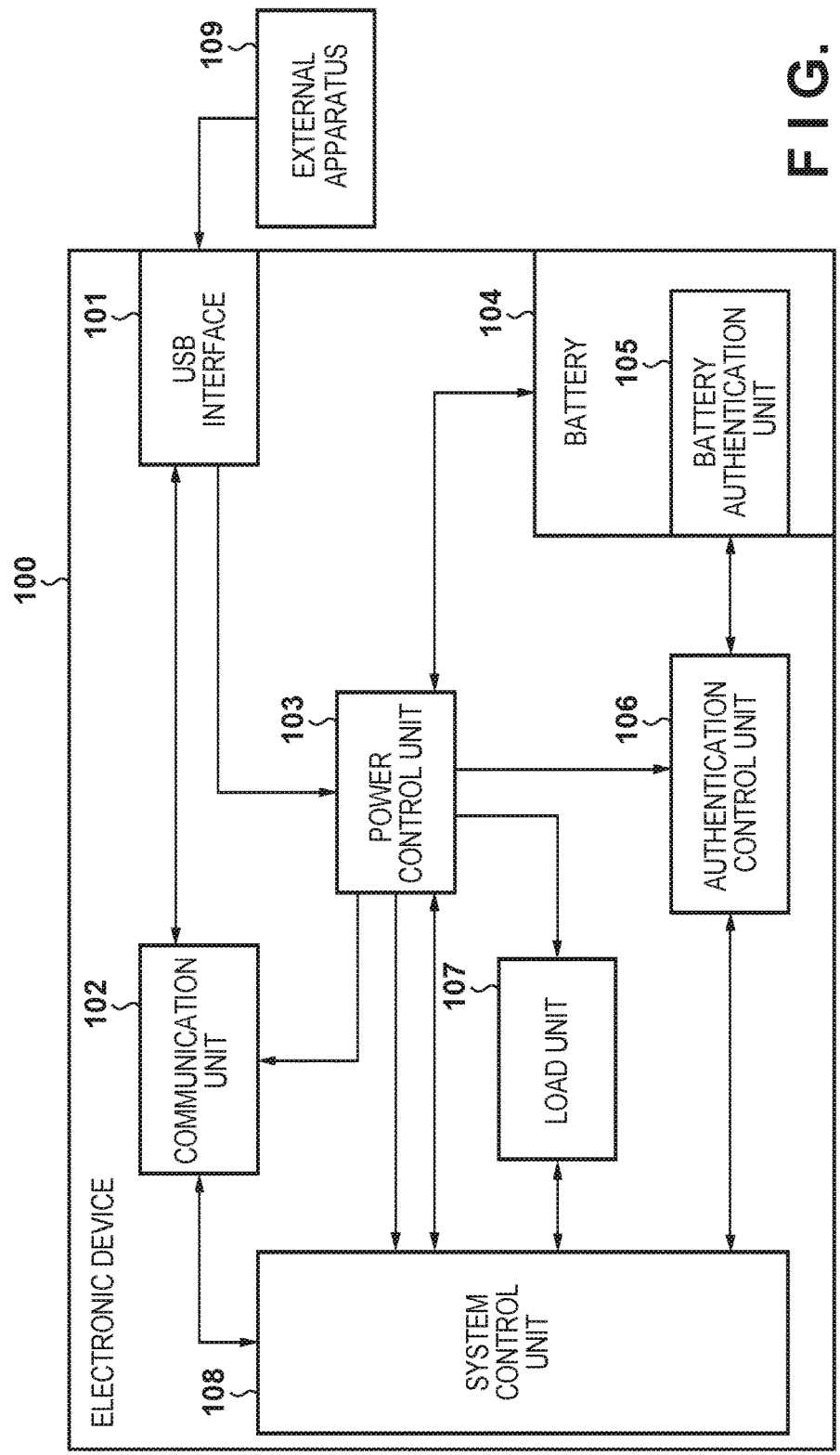
FIG. 1 is a block diagram illustrating components of an electronic device 100 according to a first embodiment.

FIG. 1 is a block diagram illustrating components of an electronic device 100 according to the first embodiment. The electronic device 100 is a portable device or the like, to/from which a chargeable battery can be attached/detached. The electronic device 100 receives power supplied from an external power source and can charge a mounted battery. An image capture apparatus such as a digital camera or a mobile phone with a camera is an example of the electronic device 100 according to the first embodiment. Although the following will show an arrangement configured to connect the electronic device 100 to an external apparatus 109 via a USB (Universal Serial Bus), an interface for connection between the electronic device 100 and the external apparatus 109 is not limited to the USB.

As shown in FIG. 1, the electronic device 100 includes a USB (Universal Serial Bus) interface 101, a communication unit 102, a power control unit 103, a battery 104, a battery authentication unit 105, an authentication control unit 106, a load unit 107, and a system control unit 108.

The USB interface 101 is an interface unit which can be connected to the external apparatus 109 such as a PC via a USB cable. The communication unit 102 and the power control unit 103 are connected to the USB interface 101. The communication unit 102 exchanges data signals with the external apparatus 109 via the USB cable connected to the USB interface 101. These data signals include image data or communication data such as enumeration data and handshake data. When the USB cable is connected to the USB interface 101, a limit value for limiting a current supplied from the external apparatus 109 is set by the power control unit 103 in accordance with USB specifications, and the power control unit 103 limits power supplied from the external apparatus 109 within the set limit value.

The power control unit 103 performs a power supply operation of supplying power to one or more of the communication unit 102, the battery authentication unit 105, the authentication control unit 106, the load unit 107, and the system control unit 108, using either or both of power supplied from the external apparatus 109 and power supplied from the battery 104. The power control unit 103 performs a charging operation of charging the battery 104 with power supplied from the external apparatus 109. The power control unit 103 may execute the power supply operation, using either or both of power supplied from the external apparatus 109 and power supplied from the battery 104, regardless of instructions from the system control unit 108. Obviously, the power supply operation of the power control unit 103 may be controlled in accordance with instructions from the system control unit 108. The arrangement of the power control unit 103 will be described in detail later.

The battery 104 is a chargeable battery such as a NiCd battery, NiMH battery, Li-ion battery, or the like. The battery 104 is detachable from the electronic device 100. In addition, the battery 104 includes the battery authentication unit 105. While the battery 104 is mounted in the electronic device 100, the battery authentication unit 105 is connected to the authentication control unit 106. The battery authentication unit 105 transmits a response signal including the authentication information of the battery in response to a control signal from the connected authentication control unit 106.

The authentication control unit 106 performs an authentication process (recognition process) with respect to the battery authentication unit 105 of the battery 104 to determine whether the battery 104 is genuine. The authentication control unit 106 transmits the authentication process result, that is, the determination result indicating whether the battery 104 is genuine or not, to the system control unit 108. An authentication process performed by the authentication control unit 106 with respect to the battery authentication unit 105 of the battery 104 will be described in detail later.

The load unit 107 includes a plurality of modules, and performs a predetermined operation by consuming power supplied from the power control unit 103. In the first embodiment, the plurality of modules included in the load unit 107 include, for example, an imaging lens which inputs an object image, an image sensor which converts the object image into electrical image information, a display unit which displays the acquired image information and various types of information including a warning, and an operation unit including a power switch and a user interface.

The system control unit 108 comprises one or more hardware processors and a storage unit, and controls the components of the electronic device 100 by causing the one or more hardware processors to execute one or more control programs stored in the storage unit. In the first embodiment, the system control unit 108 can receive power supplied from the power control unit 103 and perform a necessary operation if a limit value for limiting a current supplied from the external apparatus 109 is set to 100 mA (or more) by the power control unit 103.

Figure 2:
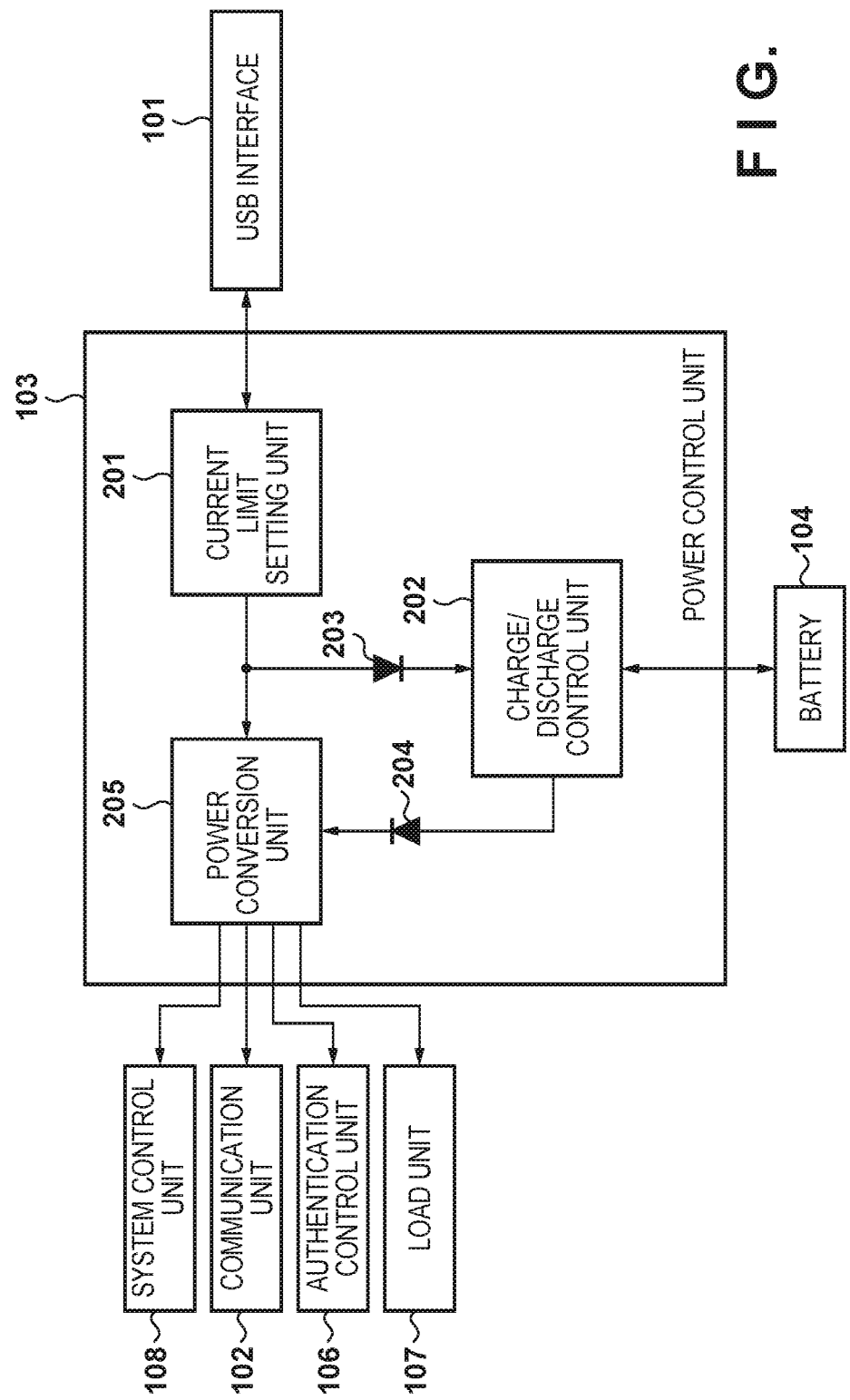
FIG. 2 is a block diagram illustrating components of a power control unit 103 according to the first embodiment.

FIG. 2 is a block diagram illustrating components of the power control unit 103. Referring to FIG. 2, the power control unit 103 includes a current limit setting unit 201, a charge/discharge control unit 202, a reverse flow prevention diode 203 for a charging path, a reverse flow prevention diode 204 for a discharging path, and a power conversion unit 205.

When a USB cable is connected to the USB interface 101, a limit value for limiting a current supplied from the external apparatus 109 is set by the current limit setting unit 201 in accordance with USB specifications, and power supplied from the external apparatus 109 is limited within the set limit value. In the first embodiment, when the USB cable is connected to the USB interface 101, the current limit setting unit 201 initially sets the limit value to 100 mA. This initially set value (i.e., 100 mA) is maintained until the completion of enumeration with the external apparatus 109 via the communication unit 102. Upon completion of the enumeration, the current limit setting unit 201 changes the limit value from the initially set value (i.e., 100 mA) to a value (equal to or more than the initially set value) which is confirmed to be able to be set by the enumeration. In the first embodiment, the current limit setting unit 201 changes the limit value from 100 mA to 500 mA.

In addition, the current limit setting unit 201 can stop power supply from the external apparatus 109 to the electronic device 100 by controlling the limit value. For example, when the current limit setting unit 201 sets the limit value to 0 mA, power supply from the external apparatus 109 is stopped. Obviously, the limit value to be set by the current limit setting unit 201 is not limited to the above values (100 mA, 500 mA, and the like).

The charge/discharge control unit 202 receives power supplied from the external apparatus 109, which is supplied with the value set by the current limit setting unit 201, via the reverse flow prevention diode 203, and performs the charging operation of charging the battery 104. In addition, the charge/discharge control unit 202 performs a power supply operation of supplying power from the battery 104 to the power conversion unit 205 via the reverse flow prevention diode 204.

The power conversion unit 205 includes a DC-DC converter, and performs power conversion using either or both of power supplied from the external apparatus 109 and power supplied from the battery 104. The converted power is supplied to one or more of the communication unit 102, the battery authentication unit 105, the authentication control unit 106, the load unit 107, and the system control unit 108.

Figure 3:
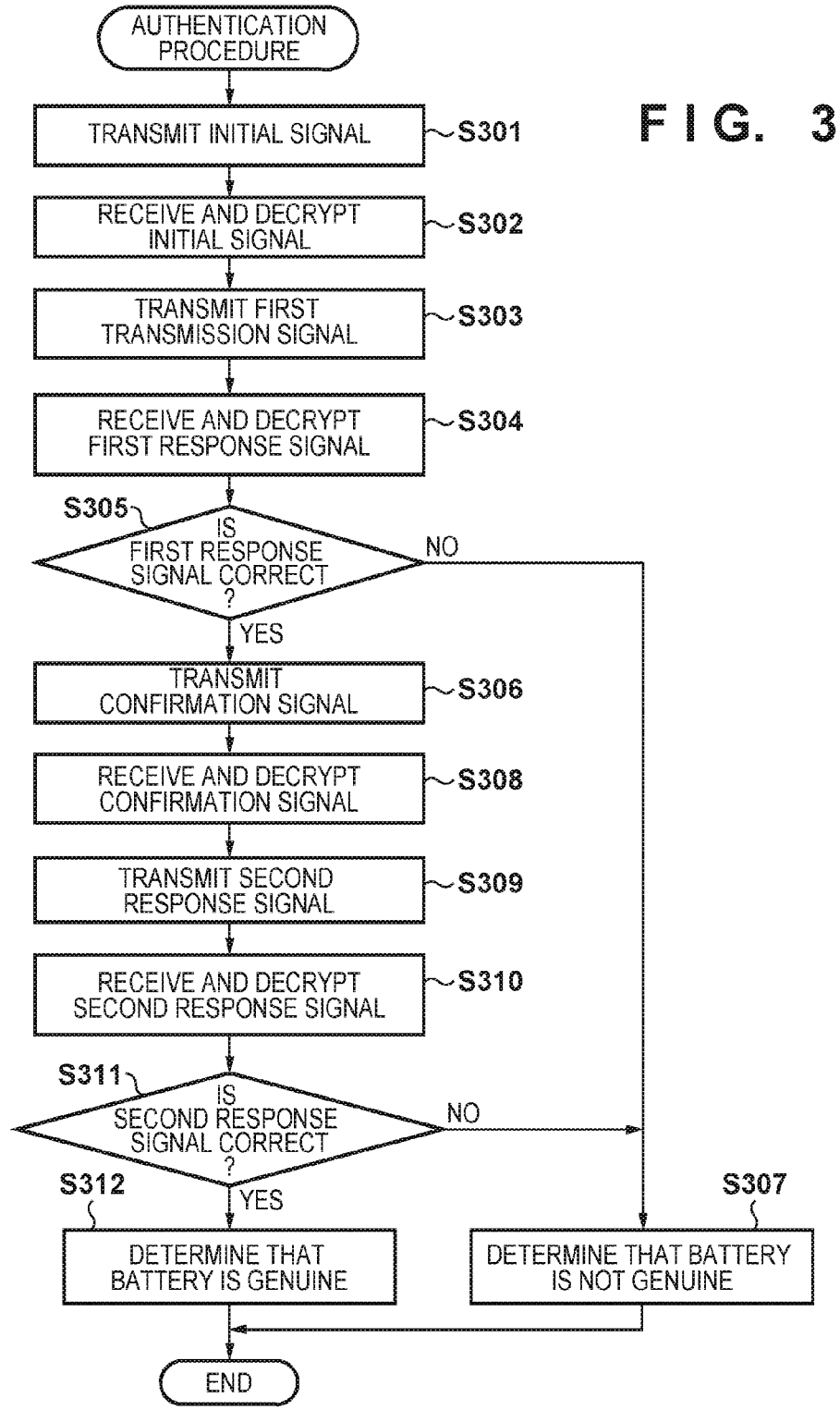
FIG. 3 is a flowchart illustrating an authentication process for a battery.

FIG. 3 is a flowchart illustrating an authentication process performed by the authentication control unit 106 and the battery authentication unit 105 of the battery 104. Note that in the flowchart of FIG. 3, steps S301, S304 to S307, and S310 to S312 are processes performed by the authentication control unit 106, and steps S302, S303, S308, and S309 are processes performed by the battery authentication unit 105.

When an authentication process is initiated, the authentication control unit 106 transmits an initial signal to the battery authentication unit 105 of the battery 104 (step S301). Upon receiving the initial signal transmitted from the authentication control unit 106, the battery authentication unit 105 decrypts the signal (step S302), generates the first response signal, and returns it to the authentication control unit 106 (step S303).

Upon receiving the first response signal returned from the battery authentication unit 105, the authentication control unit 106 decrypts the signal (step S304). If the returned first response signal is correct (YES in step S305), the authentication control unit 106 transmits a confirmation signal for reconfirmation (step S306). At this time, as the confirmation signal, a signal identical to the initial signal may be used, or a signal obtained by changing the initial signal or a signal different from the initial signal may be used. If the first response signal returned from the battery authentication unit 105 is not correct (NO in step S305), the authentication control unit 106 determines that the battery 104 is not genuine (authentication failure) (step S307), and terminates the authentication process.

Upon receiving the confirmation signal from the authentication control unit 106, the battery authentication unit 105 decrypts the signal (step S308), generates the second response signal corresponding to the confirmation signal, and returns the signal to the authentication control unit 106 (step S309). Upon receiving the second response signal returned from the battery authentication unit 105, the authentication control unit 106 decrypts the signal (step S310). If the second response signal is correct (YES in step S311), the authentication control unit 106 determines that the battery 104 is genuine (authentication success) (step S312), and terminates the authentication process. In contrast to this, if the second response signal is not correct (NO in step S311), the authentication control unit 106 determines that the battery 104 is not genuine (authentication failure) (step S307), and terminates the authentication process. The above authentication process is completed in several sec after the initiation of the authentication process.

FIG. 4 is a flowchart illustrating an exemplary process to be performed in the electronic device 100 when the external apparatus 109 is connected to the electronic device 100 via a USB cable.

Referring to FIG. 4, when the external apparatus 109 is connected to the electronic device 100 via the USB cable while the main power of the device is OFF (step S401), a limit value for limiting a current supplied from the external apparatus 109 is initially set to 100 mA by the current limit setting unit 201 of the power control unit 103 (step S402). Note that the limit value set in step S402 can be any setting that makes it possible to obtain sufficient power for the execution of the exemplary process shown in the flowchart of FIG. 4 and satisfies the USB specifications. This limit value is not limited to 100 mA and may be, for example, 500 mA.

After setting the limit value in step S402, the power control unit 103 performs a power supply operation of distributing and supplying power supplied from the external apparatus 109 to at least the communication unit 102, the authentication control unit 106, and the system control unit 108 (step S403). Obviously, the power control unit 103 may distribute and supply power supplied from the external apparatus 109 to components (e.g., the load unit 107) other than the communication unit 102, the authentication control unit 106, and the system control unit 108. At this time point, however, the power control unit 103 does not perform the charging operation of charging the battery 104 with power supplied from the external apparatus 109. Subsequently, the system control unit 108 which operates on power supplied from the external apparatus 109 executes an authentication process using the external apparatus 109 by communicating with the external apparatus 109 via the communication unit 102. In the first embodiment, USB communication is used, and the external apparatus 109 corresponding to a USB host performs enumeration for recognizing the electronic device 100 corresponding to a USB device (step S404).

The system control unit 108 can determine whether the enumeration is normally completed, by monitoring, for example, a signal representing the enumeration. If the enumeration in step S404 is not normally completed because of communication error or the like (NO in step S405), authentication has failed. The power control unit 103 therefore stops the power supply operation of distributing and supplying power supplied from the external apparatus 109 (step S406), and then the exemplary process ends. In this case, the power control unit 103 performs neither the power supply operation using USB nor the charging operation using USB.

If the enumeration in step S404 is normally completed (YES in step S405), authentication has succeeded. The power control unit 103 changes the limit value from the initially set value (e.g., 100 mA) to a value corresponding to a current which can be supplied from the external apparatus 109 to the electronic device 100, under the control of the system control unit 108 (step S407). In step S407, the power control unit 103 changes the limit value from the initially set value (e.g., 100 mA) to a value equal to or more than the initially set value. Assume that in the first embodiment, the limit value is changed to 500 mA in step S407, for example. Note however that the value set to the limit value in step S407 is equal to or more than the initially set value (e.g., 100 mA), and is not limited to 500 mA as long as it falls within the range of currents which can be supplied from the external apparatus 109 to the electronic device 100 and satisfies the USB specifications.

After changing the limit value in step S407, the system control unit 108 which operates on power supplied from the external apparatus 109 causes the authentication control unit 106 to execute an authentication process for the battery 104 (step S408). The authentication process executed in step S408 is the same as that described with reference to FIG. 3. Upon determining as a result of the authentication process in step S408 that the battery 104 is not a genuine battery (NO in step S409), the power control unit 103 stops the power supply operation of distributing and supplying power supplied from the external apparatus 109 (step S406), and then the exemplary process ends.

Note that in step S406, the system control unit 108 may display information for notifying the user to stop the power supply operation for a predetermined period, using a display unit included in the load unit 107. In this case, the power control unit 103 stops the power supply operation of distributing and supplying power supplied from the external apparatus 109, after a lapse of the predetermined period during which display is performed. The display contents displayed on the display unit may differ depending on whether the enumeration in step S404 is not completed (NO in step S405) or the battery 104 is not a genuine battery (NO in step S409). For example, the cause of stopping the power supply operation may be informed to the user by changing display contents depending on whether the cause is an enumeration failure or a battery authentication failure.

If the power control unit 103 determines that the battery 104 is not a genuine battery (NO in step S409) even though the enumeration is completed, in step S406, the power control unit 103 may not stop the power supply operation of distributing and supplying power supplied from the external apparatus 109. In this case, the power control unit 103 continues the power supply operation of distributing and supplying power supplied from the external apparatus 109, but does not perform the charging operation of charging the battery 104.

Upon determining as a result of the authentication process in step S408 that the battery 104 is a genuine battery (YES in step S409), the system control unit 108 causes the power control unit 103 to initiate the charging operation of charging the battery 104 with power supplied from the external apparatus 109 (step S410). In this case, the power control unit 103 preferably stops the power supply operation of distributing and supplying power supplied from the external apparatus 109 to at least the communication unit 102, the authentication control unit 106, and the system control unit 108. This is because stopping the power supply operation will increase power for charging the battery 104 and shorten the charging time of the battery 104.

In the electronic device 100 according to the first embodiment, since enumeration is performed first with power supplied from the external apparatus 109 via a USB cable, it is possible to clarify the identity of the external apparatus 109 as a power supply source. In addition, since the authentication process for the battery 104 mounted in the electronic device 100 is performed with power supplied from the external apparatus 109 as a power supply source, whose identity has been clarified, via a USB cable, it is possible to stably complete the authentication process for the battery 104. Furthermore, since the battery 104 whose identity has been grasped by the authentication process is charged, the safety of the electronic device 100 can be guaranteed. As has been described above, there are provided the electronic device 100 which can charge the mounted battery 104 with power supplied from the external apparatus 109 while the safety of the electronic device 100 is guaranteed and a method of controlling the electronic device 100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention are described with reference to exemplary embodiments, it is to be understood that the aspects of the present invention are not limited to the exemplary embodiments. The scope of the following claims is to be accorded the broadest interpretation so as to encompass all modifications and equivalent structures.

This application claims priority from Japanese Patent Application No. 2015-214808, filed Oct. 30, 2015 which is hereby incorporated by reference herein in its entirety.

What is claimed is:

1. An electronic device comprising:
a processor and a memory configured to function as a first unit that performs an enumeration process with power received from an external apparatus connected to the electronic device via a universal serial bus (USB) cable, wherein before the enumeration process is completed, a current flowing from the external apparatus to the electronic device is limited to a first value;
a second unit that performs a battery authentication process with power received from the external apparatus after the enumeration process is completed, wherein after the enumeration process is completed, a current flowing from the external apparatus to the electronic device is limited to a second value larger than the first value; and
a charging unit that charges a battery authenticated by the battery authentication process with power received from the external apparatus after the battery is authenticated by the battery authentication process.

2. The electronic device according to claim 1, further comprising a power control unit that stops supplying power from the external apparatus to a load unit when the enumeration process is not normally completed.

3. The electronic device according to claim 2, wherein the load unit includes a display unit that displays a warning information.

4. The electronic device according to claim 1, further comprising a power control unit that stops supplying power from the external apparatus to a load unit when the battery is not authenticated by the battery authentication process.

5. The electronic device according to claim 4, wherein the load unit includes a display unit that displays a warning information.

6. The electronic device according to claim 1, wherein the first value corresponds to 100 mA, and the second value corresponds to 500 mA.

7. The electronic device according to claim 1, wherein the battery is not charged by the charging unit with power received from the external apparatus when the enumeration process is not normally completed.

8. The electronic device according to claim 1, further comprising a power control unit that stops supplying power from the external apparatus to the second unit when the enumeration process is not normally completed.

9. The electronic device according to claim 1, further comprising a power control unit that stops supplying power from the external apparatus to the second unit when the battery is not authenticated by the battery authentication process.

10. The electronic device according to claim 1, wherein the electronic device includes a digital camera or a mobile phone.

11. A method executed by a processor of an electronic device, comprising:
causing a first unit to perform an enumeration process with power received from an external apparatus connected to the electronic device via a universal serial bus (USB) cable, wherein before the enumeration process is completed, a current flowing from the external apparatus to the electronic device is limited to a first value;
causing a second unit to perform a battery authentication process with power received from the external apparatus after the enumeration process is completed, wherein after the enumeration process is completed, a current flowing from the external apparatus to the electronic device is limited to a second value larger than the first value; and
causing a charging unit to charge a battery authenticated by the battery authentication process with power received from the external apparatus after the battery is authenticated by the battery authentication process.

12. The method according to claim 11, further comprising causing a power control unit to stop supplying power from the external apparatus to a load unit when the enumeration process is not normally completed.

13. The method according to claim 12, wherein the load unit includes a display unit that displays a warning information.

14. The method according to claim 11, further comprising causing a power control unit to stop supplying power from the external apparatus to a load unit when the battery is not authenticated by the battery authentication process.

15. The method according to claim 14, wherein the load unit includes a display unit that displays a warning information.

16. The method according to claim 11, wherein the first value corresponds to 100 mA, and the second value corresponds to 500 mA.

17. The method according to claim 11, wherein the battery is not charged by the charging unit with power received from the external apparatus when the enumeration process is not normally completed.

18. The method according to claim 11, further comprising causing a power control unit to stop supplying power from the external apparatus to the second unit when the enumeration process is not normally completed.

19. The method according to claim 11, further comprising causing a power control unit to stop supplying power from the external apparatus to the second unit when the battery is not authenticated by the battery authentication process.

20. The method according to claim 11, wherein the electronic device includes a digital camera or a mobile phone.

21. A non-transitory computer-readable storage medium that stores a computer program that, when executed by a processor of an electronic device, causes the electronic device to execute:
  causing a first unit to perform an enumeration process with power received from an external apparatus connected to the electronic device via a universal serial bus (USB) cable, wherein before the enumeration process is completed, a current flowing from the external apparatus to the electronic device is limited to a first value;
  causing a second unit to perform a battery authentication process with power received from the external apparatus after the enumeration process is completed, wherein after the enumeration process is completed, a current flowing from the external apparatus to the electronic device is limited to a second value larger than the first value; and
  causing a charging unit to charge a battery authenticated by the battery authentication process with power received from the external apparatus after the battery is authenticated by the battery authentication process.

\* \* \* \* \*